(12) United States Patent
Cole

(10) Patent No.: US 6,510,917 B2
(45) Date of Patent: Jan. 28, 2003

(54) REAR WHEEL STEERING APPARATUS

(75) Inventor: Michael James Cole, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/819,502

(22) Filed: Mar. 28, 2001

(65) Prior Publication Data
US 2002/0140198 A1 Oct. 3, 2002

(51) Int. Cl.$^7$ ................................................. B62D 5/06
(52) U.S. Cl. .................... 180/437; 180/436; 280/93.512
(58) Field of Search ................... 280/93.512; 180/414, 180/415, 417, 434, 436, 437

(56) References Cited

U.S. PATENT DOCUMENTS

| | | | | | |
|---|---|---|---|---|---|
| 2,507,106 A | * | 5/1950 | Knapp | ........................ | 180/428 |
| 2,826,258 A | * | 3/1958 | Livers | ........................ | 180/436 |
| 3,527,316 A | * | 9/1970 | Jones, Jr. et al. | ............ | 180/437 |
| 3,763,951 A | * | 10/1973 | Kristof et al. | .......... | 137/625.69 |
| 3,814,203 A | * | 6/1974 | Gieszl | ........................ | 180/414 |
| 4,140,199 A | * | 2/1979 | Lester | ........................ | 180/327 |
| 4,359,123 A | * | 11/1982 | Haupt et al. | ................ | 180/436 |
| 4,475,615 A | * | 10/1984 | Stanek | ........................ | 180/417 |
| 5,430,650 A | * | 7/1995 | Susuki et al. | ............. | 180/24.01 |
| 5,718,304 A | * | 2/1998 | Lee | .............................. | 180/414 |
| 5,734,570 A | * | 3/1998 | Arlandis | ...................... | 180/197 |
| 5,820,147 A | | 10/1998 | Rohweder et al. | | |
| 5,884,925 A | * | 3/1999 | Wong | ....................... | 280/124.1 |
| 5,899,292 A | | 5/1999 | Paul et al. | | |
| 5,954,774 A | * | 9/1999 | Jung et al. | ................... | 180/412 |
| 6,079,513 A | * | 6/2000 | Nishizaki et al. | ............ | 180/402 |
| 6,267,198 B1 | * | 7/2001 | Hurlburt et al. | ............. | 180/414 |
| 6,267,395 B1 | * | 7/2001 | Howard | .................... | 280/89.11 |
| 6,357,768 B1 | * | 3/2002 | Chan et al. | ............ | 280/124.106 |

FOREIGN PATENT DOCUMENTS

JP 59023716 A * 2/1984 ............. E02D/5/20

* cited by examiner

Primary Examiner—Avraham Lerner
Assistant Examiner—Paul Royal, Jr.
(74) Attorney, Agent, or Firm—Edmund P. Anderson

(57) ABSTRACT

A rear wheel steering apparatus for steering the rear wheels of a vehicle supported on a multi-link suspension includes a live axle and a track bar pivotally connecting the axle to a vehicle frame. Steering knuckles at opposite ends of the axle support road wheels for rotation and for steering. Steering arms extend from the steering knuckles and a drag link extends between and interconnects the steering arms. An actuator is connected between the frame and the drag link and steers the rear road wheels by alternately pushing and pulling on the drag link.

16 Claims, 5 Drawing Sheets

REAR WHEEL STEERING APPARATUS

TECHNICAL FIELD

This invention relates generally to an apparatus for steering the rear wheels of a vehicle.

BACKGROUND OF THE INVENTION

It is known to modify automotive vehicle steering characteristics by including rear-wheel steering systems. Such rear wheel steering systems are designed to augment the vehicle steering function that conventional front-wheel steering systems provide. Some rear-wheel steering systems include multi-link solid axle suspensions having track bars or "pan-hard rods" that pivotally connect a vehicle frame to the axle to minimize ride steer caused by relative vertical motion between a vehicle frame and the axle.

For example, U.S. Pat. No. 5,820,147 issued Oct. 13 1998 to Rohweder et al., discloses a rear wheel steering apparatus including a vehicle frame and a multi-link suspension including a live solid axle and a track bar or pan hard rod connected between the axle and the vehicle frame and a pair of road wheels supported at respective opposite ends of the axle by first and second steering knuckles, the knuckles supporting the road wheels for rotation about respective generally horizontal road wheel rotational axes and for pivotal motion about respective generally vertical steering axes. The rear wheel steering apparatus of the Rohweder et al. patent includes first and second steering arms extending from the respective first and second steering knuckles in a direction generally perpendicular to the respective steering axes and a drag link having a first end connected to a tie rod that extends between and interconnects respective outer ends of the steering arms. The rear wheel steering apparatus disclosed in the Rohweder et al. patent also includes a steering gear having a pitman arm connected to a second end of the drag link and configured to pivot the roadwheels about their respective pivot axes by alternately pushing and pulling on the drag link. However, a rear wheel steering apparatus constructed according to the Rohweder et al. patent requires a primary connection to a handwheel and thus is not readily adaptable to steering rear road wheels that are remote from the vehicle handwheel.

It is also known for rear wheel steering systems to employ linear steering actuators. U.S. Pat. No. 5,899,292 issued May 4, 1999 to Paul et al., discloses a hydraulic drive and steering system for a vehicle that includes rear road wheel steering arms extending from respective steering knuckles and two linear actuators connected between a frame of the vehicle and respective outer ends of the steering arms to allow an operator to steer the rear road wheels using a handwheel without a primary connection between the handwheel and the rear road wheels. However, a rear wheel steering apparatus constructed according to the Paul et al. patent cannot be incorporated into existing multi-link suspension systems without changing existing suspension geometry.

As shown in FIG. 1 in the drawings, the prior art also includes a front wheel drive system 10 having a solid axle 11 and including a linear power steering actuator 12 that connects to a drag link 14. The drag link 14 connects to a pair of steering arms 16 extending from a pair of steering knuckles 18. Extension and retraction of the power steering actuator 12 alternately pushes and pulls on the drag link 14 resulting in steering inputs to a pair of front road wheels 20 connected to the steering knuckles. The system relies on a primary connection to a hand wheel input and would be difficult to adapt for use in steering rear wheels mounted remote from the hand wheel input on a live rear axle of a vehicle in a multi-link suspension.

What is needed is a steering apparatus that can steer road wheels mounted on a rear axle of a vehicle without requiring a primary connection to the handwheel. What is also needed is such a rear wheel steering apparatus that can be incorporated into existing multi-link suspension designs without changing existing suspension geometry.

SUMMARY OF THE INVENTION

A rear wheel steering apparatus for steering the rear wheels of a vehicle is provided that includes a multi-link suspension including a live axle and a track bar pivotally connecting the axle to a vehicle frame. First and second steering knuckles are supported at respective opposite ends of the axle and are configured to support respective road wheels for rotation about respective generally horizontal road wheel rotational axes and for pivotal motion about respective generally vertical steering axes. The rear wheel steering apparatus also includes first and second steering arms that extend generally horizontally from the respective first and second steering knuckles in a direction generally perpendicular to the respective steering axes. A drag link extends between and interconnects respective outer ends of the steering arms, the ends of the arms being spaced from the respective steering knuckles.

Unlike the prior art, the rear wheel steering apparatus also includes an actuator having a first end connected to the frame and a second end connected to the drag link. The actuator is positioned and configured to pivot the roadwheels about their respective steering axes by alternately pushing and pulling on the drag link. Therefore, a rear wheel steering apparatus constructed according to the invention is able to steer road wheels mounted on a rear axle of the vehicle that is remote from the vehicle handwheel without requiring a primary connection to the handwheel. The apparatus may be readily incorporated into existing multi-link suspension designs without changing existing suspension geometry.

BRIEF DESCRIPTION OF THE DRAWINGS

These and other features and advantages of the invention will become apparent to those skilled in the art in connection with the following detailed description and drawings, in which.

DETAILED DESCRIPTION

Figure 1:
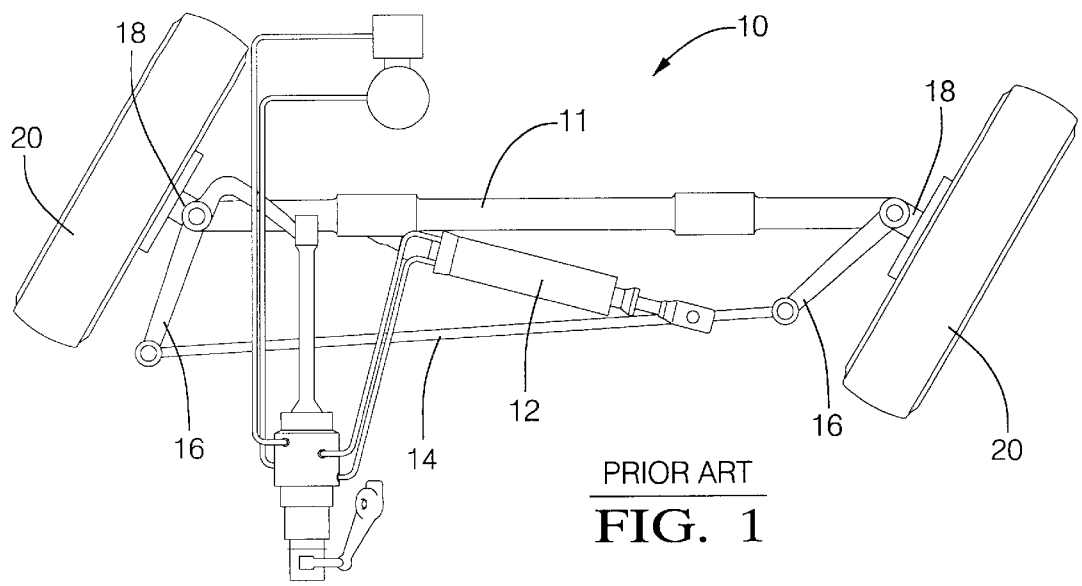
FIG. 1 is a plan view of a prior art front wheel power steering system.
Figure 2:
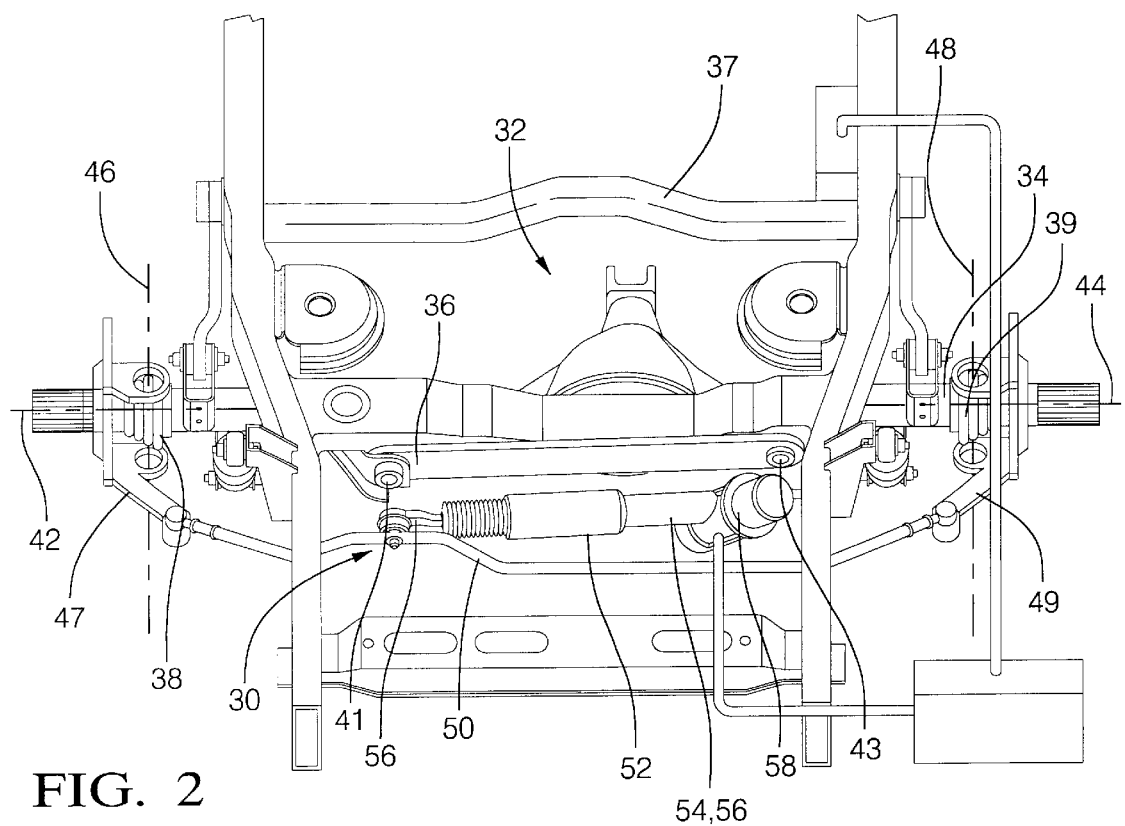
FIG. 2 is a top-rear perspective view of a rear wheel steering apparatus constructed according to the invention.
Figure 3:
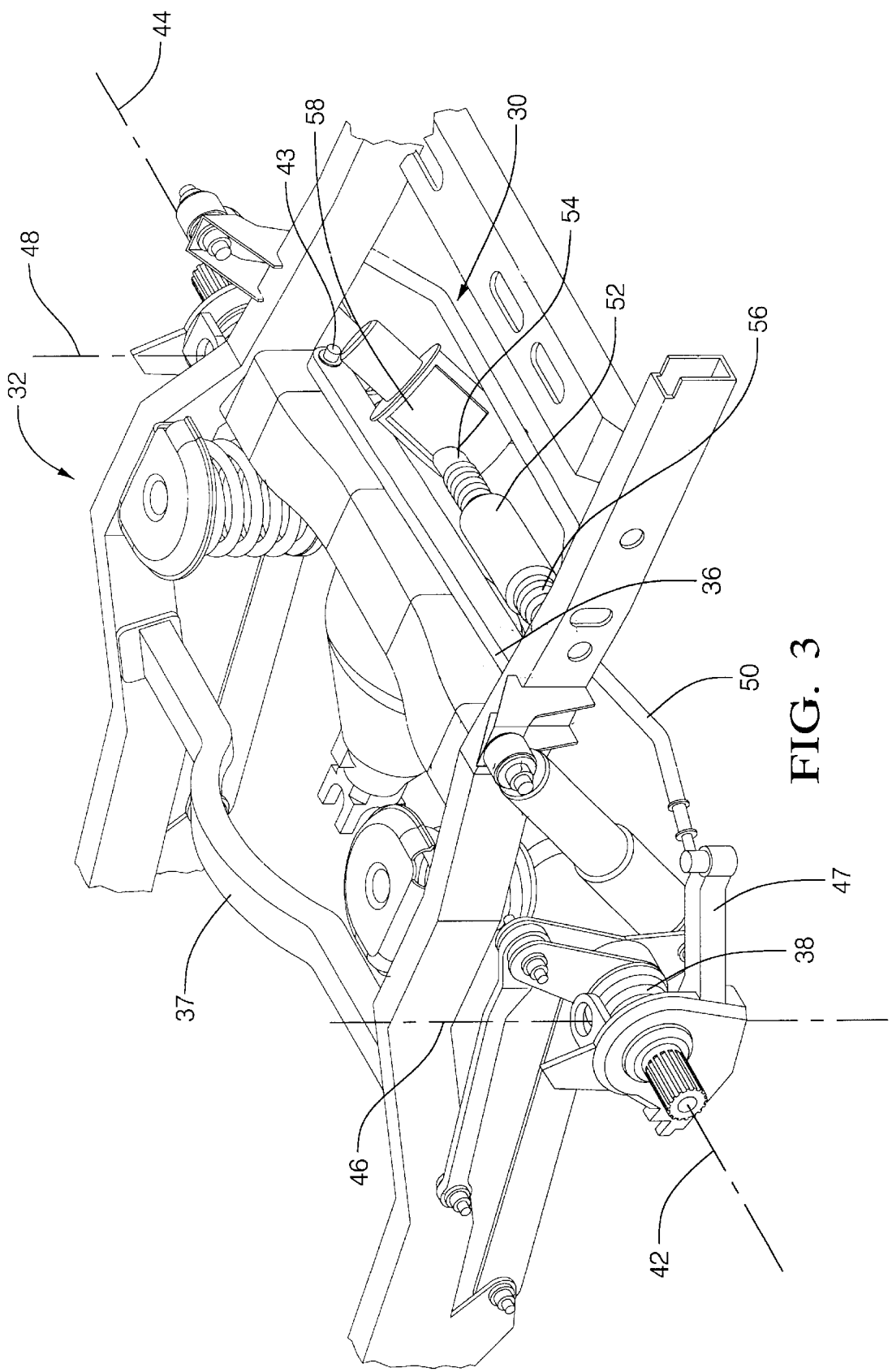
FIG. 3 is a side-rear perspective view of the rear wheel steering apparatus of FIG. 2.
Figure 4:
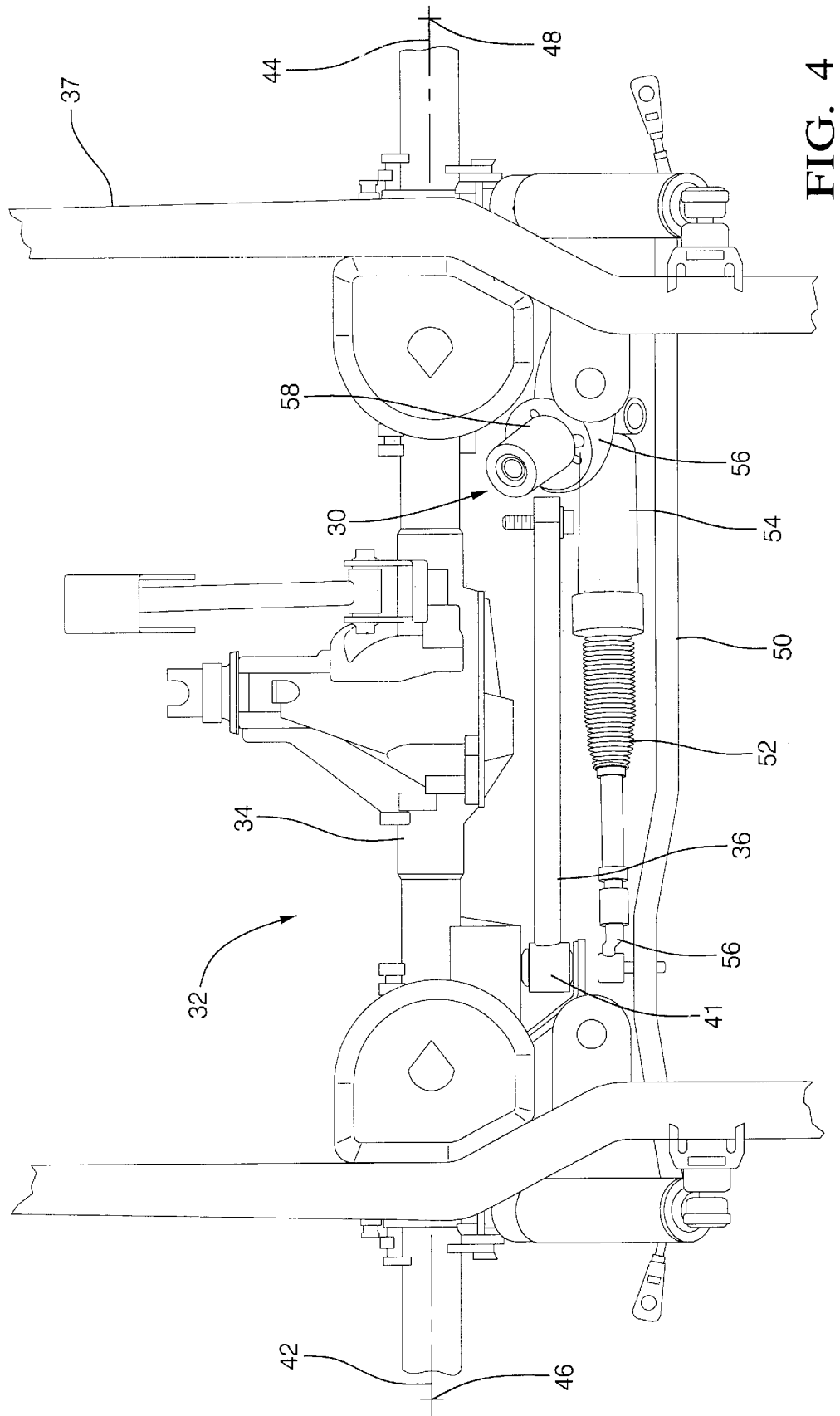
FIG. 4 is a plan view of the rear wheel steering apparatus of FIG. 2 with a frame cross member removed for clarity.

An apparatus for steering the rear wheels 40 of vehicle is generally indicated at 30, in FIGS. 2–6. The apparatus 30 is shown installed in a multi-link suspension system generally indicated at 32 in FIGS. 2–6. The multi-link suspension system 32 includes a live solid axle 34 and a track bar, or "pan-hard rod" 36. The track bar 36 pivotally connects the axle 34 to a vehicle frame 37. One end of the track bar 36 pivotally connects to the axle 34 at a first connection point 41 as is best shown in FIG. 4. An opposite end of the track bar 36 connects to the frame at a second connection point 43 as shown in FIGS. 2 and 3. In other embodiments the axle 34 need not be a solid axle.

The steering apparatus 30 includes left and right steering knuckles 38, 39 supported at respective opposite ends of the axle 34. The steering knuckles 38, 39 are configured to support respective road wheels 40 for rotation about respective left and right generally horizontal road wheel rotational axes 42, 44. The steering knuckles 38 also support the road wheels 40 for pivotal motion about respective left and right generally vertical steering axes 46, 48. Left and right steering arms 47, 49 extend generally horizontally from the respective left and right steering knuckles 38 in respective directions generally perpendicular to the respective road wheel steering axes 46, 48. A drag link 50 extends between and interconnects respective outer ends of the steering arms 47, 49. The outer ends of the steering arms 47, 49 are spaced from the respective steering knuckles 38, 39 to provide the drag link 50 with a mechanical advantage sufficient to rotate the road wheels and steering knuckles 38, 39 about the steering axes 46, 48.

The steering apparatus 30 also includes an electric double-acting linear actuator shown at 52 in FIGS. 2-6. The linear actuator 52 has a first end 54 connected to the frame 37 and a second end 56 connected to the drag link 50. The actuator 52 is positioned and configured to pivot the rear road wheels 40 about their respective steering axes 46, 48 by alternately pushing and pulling on the drag link 50. In other embodiments, the linear actuator 52 may comprise any suitable linear actuator known in the art such as a double-acting hydraulic cylinder. In an embodiment using a double-acting hydraulic cylinder, a controller would control the cylinder by operating a hydraulic valve connected to the cylinder.

Figure 5:
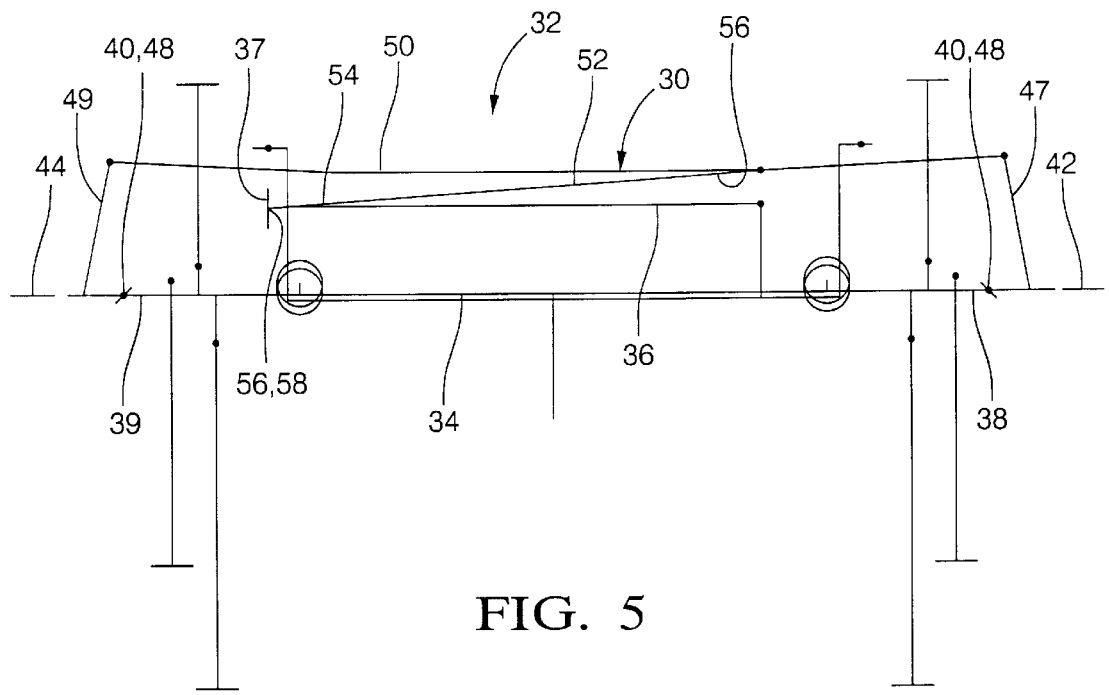
FIG. 5 is a schematic plan view of the rear wheel steering apparatus of FIG. 2.
Figure 6:
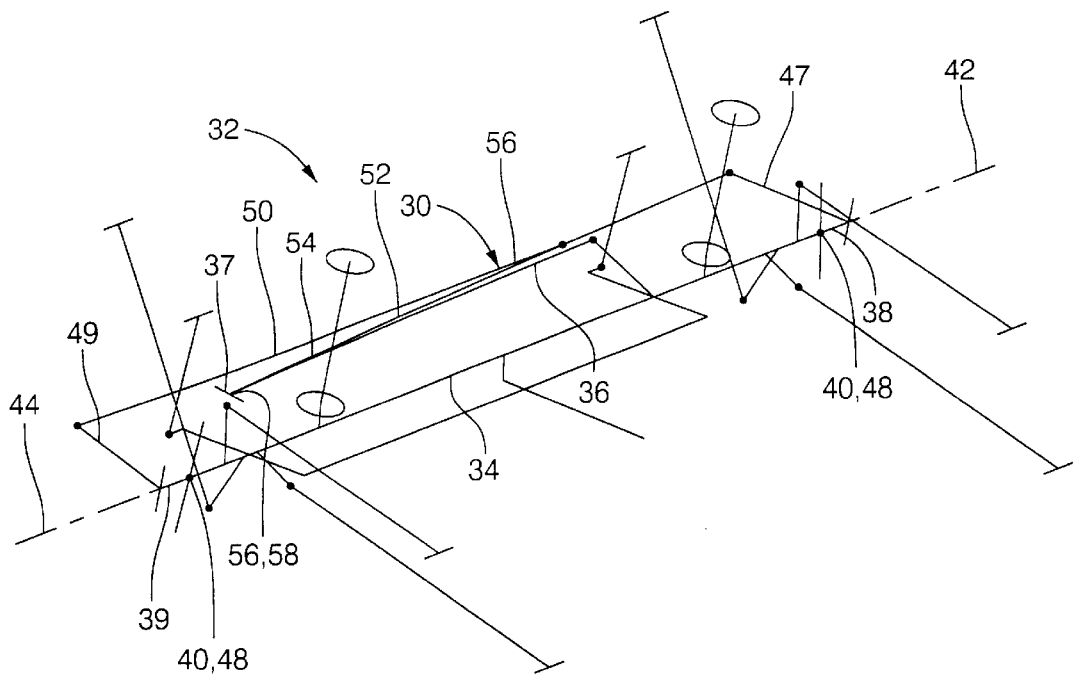
FIG. 6 is a schematic perspective view of the rear wheel steering apparatus of FIG. 2.

As is best shown in the schematic diagrams of FIGS. 5 and 6, the body origin or first end 54 of the linear actuator 52 is connected to the frame 37 at an actuator-frame connection point 56 disposed adjacent a track bar-frame connection point 58. The actuator-frame and track bar-frame connection points 56, 58 are disposed adjacent one another to minimize steering feedback, i.e., uncommanded steering inputs caused by relative motion between the frame 37 and the axle 34.

To aid in eliminating steering feedback, the linear actuator 52 is mounted in a position that allows it to operate in parallel with the track bar 36. In addition to the respective frame connection points 56, 58, or mount origins, of the actuator 52 and track bar 36 being disposed at the same approximate point, the actuator 52 and track bar 36 have the same approximate length. In a straight-ahead steering position (in which the actuator 52 holds the drag link 50 and steering bars in a position that does not angulate the rear wheels 40) the linear distance from the actuator-frame connection point to a actuator 52-drag link 50 connection point is generally equal to the linear distance from the track bar-frame mounting point to a track bar 36-axle 34 mounting point. When the actuator 52 is in the straight-ahead position, the track bar 36 causes the axle 34 to follow a radius established by the track bar 36 when the axle 34 travels up and down relative to the frame 37. Because the dynamic connection points of the actuator 52 and track bar 36 remain relatively close to one another and the respective linear distances between actuator 52 and track bar 36 mounting points are equal or nearly so, the actuator 52 is not in a position to convert relative vertical motion between the axle 34 and the frame 37 into rear wheel steering inputs of any appreciable magnitude. In other words, the vertical motion of the axle 34 relative to the frame 37 cannot cause significant extension or retraction in the actuator 52 when the actuator 52 is in the straight-ahead position.

The actuator 52 and track bar 36 are configured and positioned such that respective linear distances between actuator 52 and track bar 36 mounting points are not equal when the actuator 52 is either extended or retracted out of the straight-ahead steering position to angulate the rear road wheels 40. In other words, the length of the actuator 52 changes from that of the track bar 36 when the rear wheels 40 are angulated. This difference in lengths between the actuator 52 and the track bar 36 can result in small steering angle errors when the axle 34 moves up and down relative to the frame 37. However, the resulting amount of steering angle error is small because the difference between the linear distances is small compared to the length of the track bar 36, the vertical travel of the axle 34 from it nominal ride height and the length of steering arms 47, 49.

Figure 7:
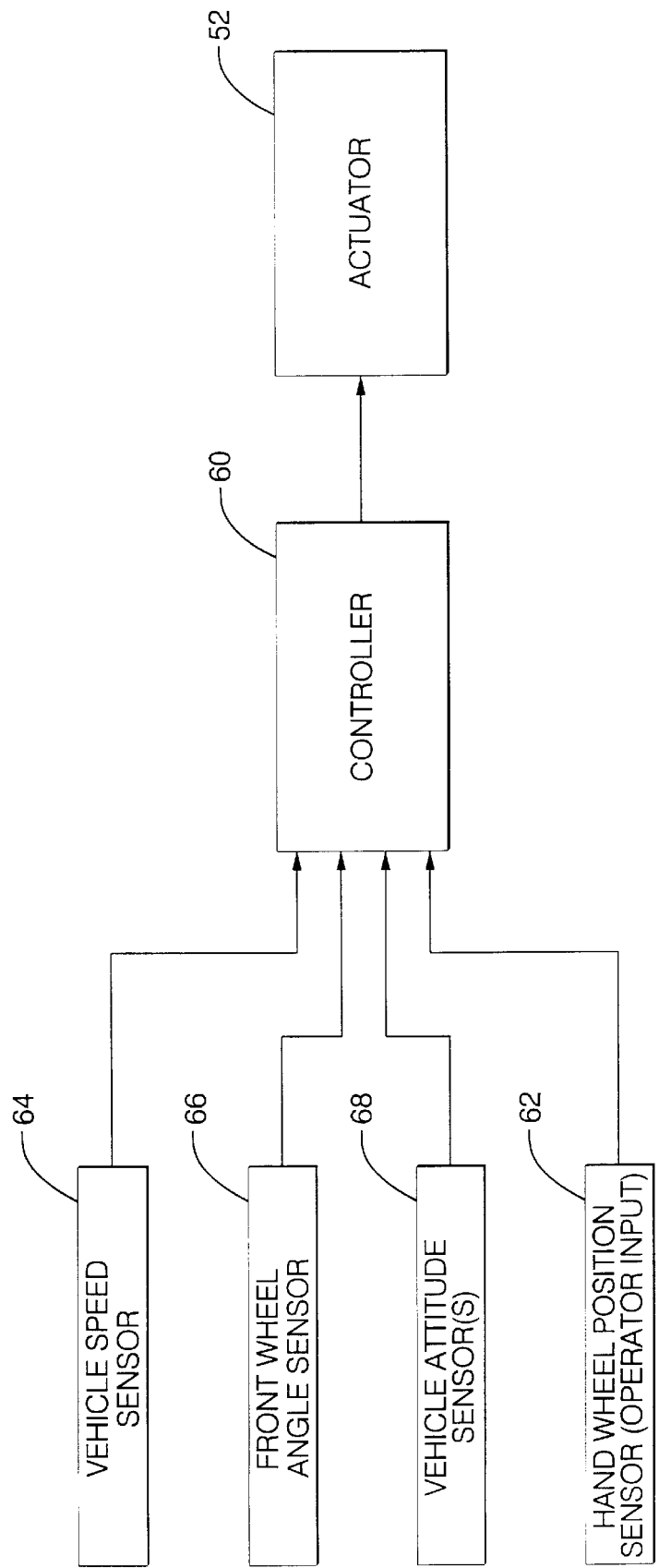
FIG. 7 is a schematic diagram of the controller, actuator and vehicle sensor(s) of the rear wheel steering apparatus of FIG. 2.

As shown in the block diagram of FIG. 7, the steering apparatus 30 includes an electronic controller 60 and a hand wheel position sensor 62 connected to the controller 60. The electronic controller 60 is configured to sense hand wheel steering inputs transmitted by the hand wheel position sensor 62. The controller 60 is connected to the actuator 52 and is programmed to send control signals to the actuator 52 to extend and contract the actuator 52 in response to signal inputs from the hand wheel position sensor 62.

The apparatus 30 also includes a vehicle speed sensor shown at 64 in FIG. 7. The vehicle speed sensor 64 is connected to the controller 60 and is configured to sense vehicle speed and provide a corresponding output signal to the controller 60. The controller 60 is configured to modify controlling inputs to the actuator 52 in response to signal inputs from the vehicle speed sensor 64. As it is explained more filly below, the controller 60 changes the amount of actuator deflection in proportion to the speed of the vehicle.

The apparatus 30 also includes a front wheel angle sensor 66 that is connected to the controller 60 and senses respective steering angles or angulation of front wheels 40 of the vehicle. (The angulation or steering angle of a wheel is the angular measure of the rotation of a wheel around its generally vertical steering axis as measured from a position in which the wheel is orientated perpendicular to the axle 34 it is supported on.) The controller 60 is configured to modify control signals to the actuator 52 in response to signal inputs from the front wheel angle sensor 66. As is more fully described below, the controller 60 will not allow the rear wheel angulation to exceed a predetermined percentage of concurrent front wheel angulation.

The controller 60 angulates the rear road wheels 40 by an amount that decreases as the speed of the vehicle increases. In other words, the controller allows the rear wheels 40 turn less at high speed and more at low speed. This inverse relationship reduces steering sensitivity at high speed and increases steering sensitivity at a low speed.

The controller 60 commands the actuator 52 to steer the rear road wheels 40 out of phase with the front road wheels 40, i.e., opposite the direction of the front road wheels 40, when the vehicle is traveling at less than a predetermined speed. This causes the rear road wheels 40 to follow the arcuate track of the respective front wheels 40 rather than "cutting the corner" as they would do if they were either unsteered or steered in phase.

The controller 60 limits rear wheel steering to a maximum of one-half the concurrent steering angle of the front wheels 40. Because front wheel steering angles normally do not exceed two degrees at high speed, rear wheel steering is normally limited to a maximum of one degree at high speed. Therefore, even if the rear axle 34 were to experience significant vertical deflection during a lane change at high speed, the resulting uncommanded steering input or feedback transmitted to the hand wheel, would be minute. The resulting uncommanded steering input would be minute both because the actuator 52 and track bar 36 dynamic connection points are either co-located or are very close together and because the controller 60 will cut in half what ever small amount of deflection occurs. At very low speeds, movements of the axle 34 are much slower and less severe and the controller 60 commands the actuator 52 to turn the rear wheels 40 out of phase. Therefore, at low speeds, even when the rear steering angle is at its maximum, any uncommanded steering inputs will pose no threat to directional stability or occupant safety.

The steering apparatus 30 also includes a vehicle attitude sensor such as a ride height or yaw sensor 68 that is supported in the vehicle and is connected to the controller 60. The vehicle attitude sensor 68 is positioned on a "sprung" portion of the vehicle such as the vehicle frame to detect vehicle attitude changes that are known to cause uncommanded steering inputs by changing actuator 52 length through frame 37 movement relative to the axle 34 and drag link 50. The controller 60 receives vehicle attitude signals from the vehicle attitude sensor 68 and, in response, commands changes in actuator length to eliminate the uncommanded steering inputs that the vehicle attitude changes would otherwise have caused.

Because the body origin 54 of the actuator 52 of the steering apparatus 30 is mounted to the frame 37, the mass of the axle 34 is lower than it would be if the actuator 52 where mounted to the axle 34 as in some prior art systems. In addition, the steering apparatus 30 described above may be incorporated into the multi-link rear suspension of a motor vehicle without modifying existing suspension geometry. By simply adding steering knuckles 38 with steering arms 47, 49 connected by a drag link 50 and by installing a linear actuator 52 between the frame 37 and drag link 50. The installation can be accomplished regardless of axle configuration or size. The cost and complexity of the steering apparatus 30 is minimized because its design is not dependent on the configuration of any particular multi-link suspension system.

The description is intended to illustrate presently preferred embodiments of the invention and not to limit the invention. The invention is defined in the claims.

Obviously, many modifications and variations are possible in light of the above teachings. It is therefore to be understood that, within the scope of the claims, one may practice the invention other than as specifically described.

What is claimed is:

1. An apparatus for steering the rear wheels of a vehicle, the apparatus comprising:
    a multi-link suspension including an axle and a track bar pivotally connecting the axle to a vehicle frame;
    first and second steering knuckles supported at respective opposite ends of the axle and configured to support respective road wheels for rotation about respective generally horizontal road wheel rotational axes and for pivotal motion about respective generally vertical steering axes;
    first and second steering arms extending generally horizontally from the respective first and second steering knuckles in a direction generally perpendicular to the respective steering axes;
    a drag link extending between and interconnecting respective outer ends of the steering arms spaced from the respective steering knuckles; and
    an actuator having a first end connected to the frame and a second end connected to the drag link, the actuator positioned and configured to pivot the roadwheels about their respective steering axes by alternately pushing and pulling on the drag link.

2. A rear wheel steering apparatus as defined in claim 1 in which the actuator is connected in parallel with the track bar, a first end of the actuator being connected to the frame at an actuator-frame connection point disposed adjacent a track bar-frame connection point.

3. A rear wheel steering apparatus as defined in claim 1 in which the actuator is a double-acting linear actuator.

4. A rear wheel steering apparatus as defined in claim 1 and further including:
    a controller connected to the actuator; and
    a handwheel position sensor connected to the controller and configured to sense handwheel steering inputs, the controller being configured to control the actuator to move the drag link in response to signal inputs from the handwheel position sensor.

5. A rear wheel steering apparatus as defined in claim 4 and further including a vehicle speed sensor connected to the controller and configured to sense vehicle speed, the controller configured to control the actuator to move the drag link in response to signal inputs from the vehicle speed sensor.

6. A rear wheel steering apparatus as defined in claim 4 and further including a front wheel angle sensor connected to the controller and configured to sense respective steering angles of front wheels of the vehicle, the controller configured to control the actuator to move the drag link in response to signal inputs from the front wheel angle sensor.

7. A rear wheel steering apparatus as defined in claim 3 in which a first end of the linear actuator is a body origin of the actuator.

8. A rear wheel steering apparatus as defined in claim 3 in which the linear actuator is configured and positioned to operate in parallel with the track bar.

9. A rear wheel steering apparatus as defined in claim 3 in which respective frame connection points of the actuator and track bar are at the same approximate point.

10. A rear wheel steering apparatus as defined in claim 3 in which the actuator and track bar are configured and positioned such that when the drag link and steering bars are in a position that does not angulate the rear wheels, the linear distance from the actuator-frame connection point to an actuator-drag link connection point is generally equal to the linear distance from the track bar-frame mounting point to a track bar-axle mounting point.

11. A rear wheel steering apparatus as defined in claim 10 in which the actuator and track bar are configured and positioned such that inequalities in the respective linear distances between actuator and track bar mounting points are small enough compared to track bar length, vertical axle travel and steering arm length, to preclude significant uncommanded steering inputs.

12. A rear wheel steering apparatus as defined in claim 4 in which the controller is configured to angulate the rear road wheels by an amount that decreases as the speed of the vehicle increases.

13. A rear wheel steering apparatus as defined in claim 4 in which the controller is configured to steer the rear road wheels out of phase with the front road wheels when the vehicle is traveling at less than a predetermined speed.

14. A rear wheel steering apparatus as defined in claim 4 in which the controller is configured to limit rear wheel steering to a maximum of half the steering angle of the front wheels.

15. A rear wheel steering apparatus as defined in claim 4 in which a vehicle attitude sensor is supported in the vehicle, is connected to the controller and is configured and positioned to detect vehicle attitude changes, the controller being configured to receive vehicle attitude signals from the vehicle attitude sensor and to command changes in actuator length to counter uncommanded steering inputs that the vehicle attitude changes would otherwise have caused.

16. An apparatus for steering the wheels of a vehicle having a multi-link suspension including an axle and a track bar pivotally connecting the axle to a vehicle frame, the apparatus comprising:

first and second steering knuckles supported at respective opposite ends of the axle and configured to support respective road wheels for rotation about respective generally horizontal road wheel rotational axes and for pivotal motion about respective generally vertical steering axes;

first and second steering arms extending generally horizontally from the respective first and second steering knuckles in a direction generally perpendicular to the respective steering axes;

a drag link extending between and interconnecting respective outer ends of the steering arms spaced from the respective steering knuckles;

an actuator having a second end connected to the drag link and configured to pivot the roadwheels by alternately pushing and pulling on the drag link; and characterized by:

the actuator being connected in parallel with the track bar with a first end of the actuator connected to the vehicle frame to reduce the weight of the axle and to minimize ride steer.

* * * * *